US012519610B2

(12) United States Patent
Stupakov et al.

(10) Patent No.: US 12,519,610 B2
(45) Date of Patent: Jan. 6, 2026

(54) EFFICIENT COMPUTATION OF BIVARIATE STATISTICAL MOMENTS FOR SIDE CHANNEL VULNERABILITY EVALUATION

(71) Applicant: Cryptography Research, Inc., Sunnyvale, CA (US)

(72) Inventors: Ilya Stupakov, Novosibirsk (RU); Anton Kochepasov, San Francisco, CA (US)

(73) Assignee: Cryptography Research, Inc., San Jose, CA (US)

(*) Notice: Subject to any disclaimer, the term of this patent is extended or adjusted under 35 U.S.C. 154(b) by 1061 days.

(21) Appl. No.: 16/280,977

(22) Filed: Feb. 20, 2019

(65) Prior Publication Data
US 2019/0260572 A1    Aug. 22, 2019

Related U.S. Application Data

(60) Provisional application No. 62/692,174, filed on Jun. 29, 2018, provisional application No. 62/633,559, filed on Feb. 21, 2018.

(51) Int. Cl.
*H04L 9/00* (2022.01)
*G06F 17/16* (2006.01)
(Continued)

(52) U.S. Cl.
CPC ............. *H04L 9/003* (2013.01); *G06F 17/16* (2013.01); *G06F 21/556* (2013.01); *G06F 21/577* (2013.01)

(58) Field of Classification Search
CPC ....... H04L 9/003; G06F 17/16; G06F 21/556; G06F 21/577
See application file for complete search history.

(56) References Cited

U.S. PATENT DOCUMENTS 9,906,360 B2 * 2/2018 Johnson ................ H04L 9/0631
10,348,380 B1 * 7/2019 Qi ........................ H04B 7/0417
(Continued)

OTHER PUBLICATIONS

Myoungkeun Choi et al., "Efficient Calculation of Statistical Moments for Structural Health Monitoring", Journal of Structural Health Monitoring, Jan. 1, 2010, pp. 13-14, vol. 9 No. 1.
(Continued)

*Primary Examiner* — Philip J Chea
(74) *Attorney, Agent, or Firm* — Lowenstein Sandler LLP (57) ABSTRACT

Systems and methods for efficient computation of bivariate statistical moments. An example method comprises: determining exponents characterizing a bivariate mean value referenced by a definition of a statistical moment to be computed; receiving an input data set representing a plurality of observed values of one or more variables, the input data including a plurality of traces, each trace of the plurality of traces including a plurality of sample points; generating an initial matrix comprising combinations of pre-determined degrees of the sample points; producing an intermediate result matrix represented by a product of multiplying a transpose of the initial matrix by the initial matrix; retrieving an element of the intermediate result matrix, wherein indices of the element are defined based on the exponents; and using the retrieved element of the intermediate result matrix to compute the statistical moment.

8 Claims, 5 Drawing Sheets

(51) Int. Cl.
  *G06F 21/55*  (2013.01)
  *G06F 21/57*  (2013.01)

(56) References Cited

U.S. PATENT DOCUMENTS

| | | | |
|---|---|---|---|
| 2008/0208560 A1* | 8/2008 | Johnson | G06F 21/14 703/22 |
| 2018/0365195 A1* | 12/2018 | Rioul | G06N 7/00 |
| 2019/0140821 A1* | 5/2019 | Junio Da Cruz | G09C 1/00 |
| 2020/0120110 A1* | 4/2020 | Stokes, III | G06N 3/0445 |

OTHER PUBLICATIONS

Oscar Reparaz et al., "Fast Leakage Assessment", W. Fischer and N. Homma, editors, Cryptographic Hardware and Embedded Systems—CHES 2017—19th International Conference, Taipei, Taiwan, Sep. 25-28, 2017, Proceedings, vol. 10529 of Lecture Notes in Computer Science. pp. 387-399. Springer. 2017.

Philippe Pebay et al., "Numerically stable, scalable formulas for parallel and online computation of higher-order multivariate central moments with arbitrary weights", Computational Statistics (2016) 31, 1305-1325 DOI 10.1007/s00180-015-0637-z, 2016.

Philippe Pebay, "Formulas for Robust, One-Pass Parallel Computation of Covariances and Arbitrary-Order Statistical Moments", Sandia Report, Sep. 2008, SAND2008-6212.

Tobias Schneider et al., "Leakage Assessment Methodology—a clear roadmap for side-channel evaluations", Horst Gortz Institute for IT-Security, Ruhr-University Bochum Germany.

Tony F. Chan et al., "Updating Formulae and a Pairwise Algorithm For Computing Sample Variances", STAN-CS-79-773, Nov. 1979, Department of Computer Science School of Humanities and Sciences Stanford University.

\* cited by examiner

FIG. 1

$$X^TX = \begin{bmatrix} \sum 1 & \sum x_{i,1} & \cdots & \sum x_{i,n} & \sum x_{i,1}^2 & \cdots & \sum x_{i,n}^2 \\ \sum x_{i,1} & \sum x_{i,1}^2 & \cdots & x_{i,1}x_{i,n} & \sum x_{i,1}^3 & \cdots & \sum x_{i,1}x_{i,n}^2 \\ \vdots & \vdots & \ddots & \vdots & \vdots & \ddots & \vdots \\ \sum x_{i,n} & \sum x_{i,n}x_{i,1} & \cdots & \sum x_{i,n}^2 & \sum x_{i,n}x_{i,1}^2 & \cdots & \sum x_{i,n}^3 \\ \sum x_{i,1}^2 & \sum x_{i,1}^3 & \cdots & \sum x_{i,1}^2 x_{i,n} & \sum x_{i,1}^4 & \cdots & \sum x_{i,1}^2 x_{i,n}^2 \\ \vdots & \vdots & \ddots & \vdots & \vdots & \ddots & \vdots \\ \sum x_{i,n}^2 & \sum x_{i,n}^2 x_{i,1} & \cdots & \sum x_{i,n}^3 & \sum x_{i,n}^2 x_{i,1}^2 & \cdots & \sum x_{i,n}^4 \end{bmatrix}$$

EFFICIENT COMPUTATION OF BIVARIATE STATISTICAL MOMENTS FOR SIDE CHANNEL VULNERABILITY EVALUATION

RELATED APPLICATIONS

This application claims the benefit of U.S. Provisional Application No. 62/633,559 filed Feb. 21, 2018, titled "A Method and Structure to Improve Higher-Order Statistic Algorithms Computational Efficiency" and U.S. Provisional Application No. 62/692,174 filed Jun. 29, 2018, titled "Efficient Computation of Bivariate Statistical Moments for Side Channel Vulnerability Evaluation." Both above referenced provisional applications are incorporated herein by reference in their respective entireties.

TECHNICAL FIELD

The present disclosure is generally related to computer systems, and is more specifically related to cryptographic data processing systems and computational methods.

BACKGROUND

Statistical moment is a specific quantitative measure characterizing a set of sample points representing a probability distribution function. The first moment is the mean (expected value), the second central moment is the variance, the third central moment is the skewness, and the fourth central moment (with normalization and shift) is the kurtosis of the probability distribution. While higher statistical moments (fifth, sixth, etc.) may be utilized, they do not have particular names.

Bivariate analysis is a form of quantitative (statistical) analysis, which involves the analysis of two variables for the purpose of determining the relationship between them. Moments of bivariate analysis include covariance, co-skewness, co-kurtosis, and other higher moments.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for efficient computation of bivariate statistical moments, which may be utilized for performing various data analysis tasks. In particular, the computational methods described herein may be utilized for the side channel analysis, such as differential power analysis (DPA) or correlation power analysis (CPA) of cryptographic data processing devices. "Cryptographic data processing device" herein shall refer to a data processing device (e.g., a general purpose or specialized processor, a system-on-chip, a cryptographic hardware accelerator, or the like) utilized for performing cryptographic data processing operations.

DPA or CPA measures the power consumption by certain circuits of a target cryptographic data processing device in response to varying one or more data inputs of sequential data manipulation operations. Thus, DPA, CPA, and/or various other side channel analysis methods may be employed by malicious third parties in an attempt to exploit interactions of sequential data manipulation operations which are based on certain internal states of the target cryptographic data processing device in order to determine one or more protected data items (e.g., encryption keys), which act as operands of the data manipulation operations.

In order to evaluate a potential side channel attack vulnerability of a cryptographic data processing device, the device may be extensively tested by recording side channel responses (such as the power consumption, the electromagnetic emission, the sound emission, the heat emission, etc.) to various sequences of data processing operations being performed by the device. The acquired responses may then be analyzed in an attempt to detect correlations between the data being processed and the measured responses. A detected correlation may be indicative of the device potential vulnerability to side channel attacks.

In the quantitative research methodology, determining whether two data samples are correlated or significantly different from each other may involve, e.g., performing Welch's t-test, in which the test statistic t follows a Student's t-distribution. Alternatively, Student's t-test statistics and/or other statistical hypothesis tests may be utilized.

The t-test examines a value indicative of the validity of the null hypothesis, which assumes that the means of two samples are equal (i.e., both samples have been drawn from the same statistical population and therefore are statistically indistinguishable from each other). Student's or Welch's t-test statistic may be computed as follows:

$$t = (\mu_0 - \mu_1)/\sqrt{(s_0^2/m_0 + s_1^2/m_1)}$$

where $\mu_0$ and $\mu_1$ are the sample means of the first and second datasets, respectively, represented by vectors having the same size as the processed waveforms; the vectors may also represent a part of that waveform, e.g. a sub-array, or the vectors may be a concatenation of two or more sub-arrays, $s_0^2$ and $s_1^2$ are variances of the first and second datasets, respectively, and $m_0$ and $m_1$ are the number of sample traces in the first and second datasets, respectively.

In certain implementations, a threshold value of the t-test statistic| (e.g., T=4.5) may be defined to reject the null hypothesis with a chosen confidence level (e.g., the confidence level exceeding 0.99999), such that the value of |t| exceeding the chosen threshold is indicative of the samples being significantly different; otherwise, there may be the samples may be correlated.

In common implementations, the computational complexity of determining values of means, variances, and/or higher-order statistics may become a critical factor for various practical implementations operating with large data sets. By providing efficient one-pass methods of computation of higher-order statistics, which may be utilized for performing various data processing tasks, implementations of the present disclosure represent improvements to the functionality of general purpose and/or specialized computer systems. The inventors have shown that the methods described herein compute higher-order statistic by at least one order of magnitude faster than most common methods. In another aspect, the systems and methods described herein represent improvements to design of cryptographic data processing devices, by enabling efficient testing of such devices for evaluating their side channel attack vulnerability.

Figure 1:
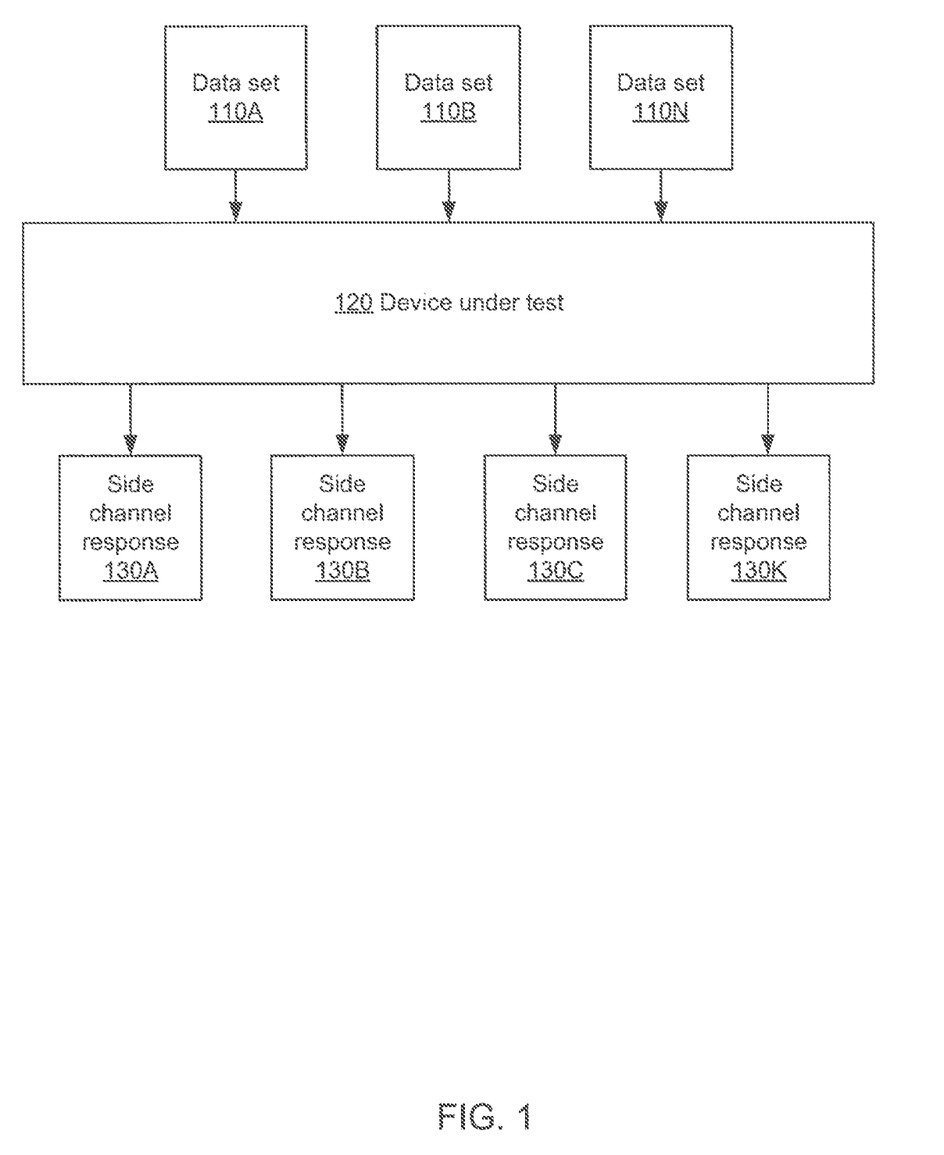
FIG. 1 schematically illustrates an example method of evaluating side channel attack vulnerability of a cryptographic data processing device, in accordance with one or more aspects of the present disclosure.

The statistical moment computation methods described herein may be utilized for the statistical analysis of the acquired side channel responses of a target cryptographic data processing device. As schematically illustrated by FIG. 1, the device vulnerability evaluation procedure may, consecutively and/or simultaneously, feed one or more input data sets 110A-110N to the device under test 120 while recording the respective side-channel response waveforms 130A-130K (e.g., reflecting the power consumption, the electromagnetic emission, the sound emission, and/or the heat emission) of the device. The digitized waveforms 130 may then be compared to the respective inputs 110 and/or to each other, e.g., by computing Welch's or Student's t-test values or performing other methods of statistical hypothesis testing, which may then be utilized for making the decision on the device under test vulnerability to side channel attacks, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation. In particular, certain higher-order bivariate statistics and computational examples and referenced and described for illustrative purposes only and do not limit the scope of the present disclosure to any particular bus width values.

Methods of the present disclosure may operate on sets of observed values of one or more variables being analyzed, such that each set of observed values includes multiple traces, and each trace in turn includes one or more sample points, or observations (measurements). Given an example data set of m traces, in which each trace includes n sample points, the first two bivariate normalized moments may be computed as follows:

$$\tilde{\mu}_{ij} = E[(x_i - \mu_i)(x_j - \mu_j)] = E[x_i x_j] - \mu_i \mu_j \qquad (1)$$

$$\tilde{\sigma}_{ij}^2 := \qquad (2)$$
$$E[(x_i - \mu_i)^2 (x_j - \mu_j)^2] - \tilde{\mu}_{ij}^2 = E[x_i^2 x_j^2] - 2\mu_j E[x_i^2 x_j] - 2\mu_i E[x_i x_j^2] +$$
$$4\mu_i \mu_j E[x_i x_j] + \mu_j^2 E[x_i^2] + \mu_i^2 E[x_j^2] - 3\mu_i^2 \mu_j^2 - \tilde{\mu}_{ij}^2$$

where $\tilde{\mu}_{ij} = E[(x_i - \mu_i)(x_j - \mu_j)] = E[x_i x_j] - \mu_i \mu_j$ $\tilde{\mu}_{ij}$ is the normalized bivariate mean, and $\tilde{\sigma}_{ij}^2$ is the normalized bivariate variance of the example data set.

The higher-order statistical moments, such as co-skewness, co-kurtosis, etc., may similarly be computed using their respective definitions. Thus, computations of all statistical moments utilizes the respective normalized expected values of $E[(x_i - \mu_i)^k (x_j - \mu_j)^l]$, which may be efficiently computed based on the following equation, which applies the binomial theorem to the definition of the higher-order bivariate statistical moment:

$$E((x_i - \mu_i)^k (x_j - \mu_j)^l) = \qquad (3)$$
$$\sum_{p=0}^{k} \sum_{q=0}^{l} (-1)^{k+l-p-q} \binom{k}{p} \binom{l}{q} E(x_i^p x_j^q) \mu_i^{k-p} \mu_j^{l-q}$$

where k and l are exponents,
$x_{ij}$ is the i-th sample, $x_{ij} x_{ij}$ is the j-th sample, and
$\mu_i$ is the mean of the i-th sample, $\mu_j$ is the mean of the j-th sample.

As can be seen from the above equations, the computations utilize various combinations of all degrees of the sample points, up to and including the degree corresponding to the ordinal number of the highest moment being computed (e.g., the first degree for the mean, the second degree for the variation, the third degree for the co-skewness, etc.).

Therefore, the initial step of the computation may involve generating a rectangular matrix X containing various combinations of all requisite degrees of the sample points:

$$X = \begin{bmatrix} 1 & x_{11} & \dots & x_{1n} x_{11}^2 & \dots & x_{1n}^2 & \dots & x_{11}^p & \dots & x_{1n}^p \\ \vdots & \vdots & & \vdots & \ddots & \vdots & \dots & \vdots & \ddots & \vdots \\ 1 & x_{m1} & \dots & x_{mn} x_{m1}^2 & \dots & x_{mn}^2 & \dots & x_{m1}^p & \dots & x_{mn}^p \end{bmatrix} \qquad (4)$$

Matrix X contains m rows and (n*p+1) columns, where p is the maximum requisite degree corresponding to the ordinal number of the highest statistical moment being computed. Each row of the matrix may be represented by a vector including an element equal to one and also including p sequences of elements, such each sequence includes n elements representing a corresponding degree of all sample points, and the sequences can appear in any order. Similarly, rows of the matrix (representing the respective traces) may appear in any order. Furthermore, in certain implementations, the matrix may contain additional rows and/or columns carrying some auxiliary or other related data, in which case the matrix would contain (m+q) rows and (n*p+r) columns, where q and r represent the numbers or rows and columns carrying the auxiliary or other related data.

Accordingly, another example of the structure of matrix X may be represented as follows:

$$X = \begin{bmatrix} x_{m1}^p & \dots & x_{mn}^p & \dots & x_{m1} & \dots & x_{mn} & 1 & x_{m1}^2 & \dots & x_{mn}^2 \\ \vdots & \ddots & \vdots & \vdots & \vdots & \ddots & \vdots & \vdots & \vdots & \ddots & \vdots \\ x_{11}^p & \dots & x_{1n}^p & \dots & x_{11} & \dots & x_{1n} & 1 & x_{11}^2 & \dots & x_{1n}^2 \end{bmatrix} \qquad (5)$$

Figure 2:
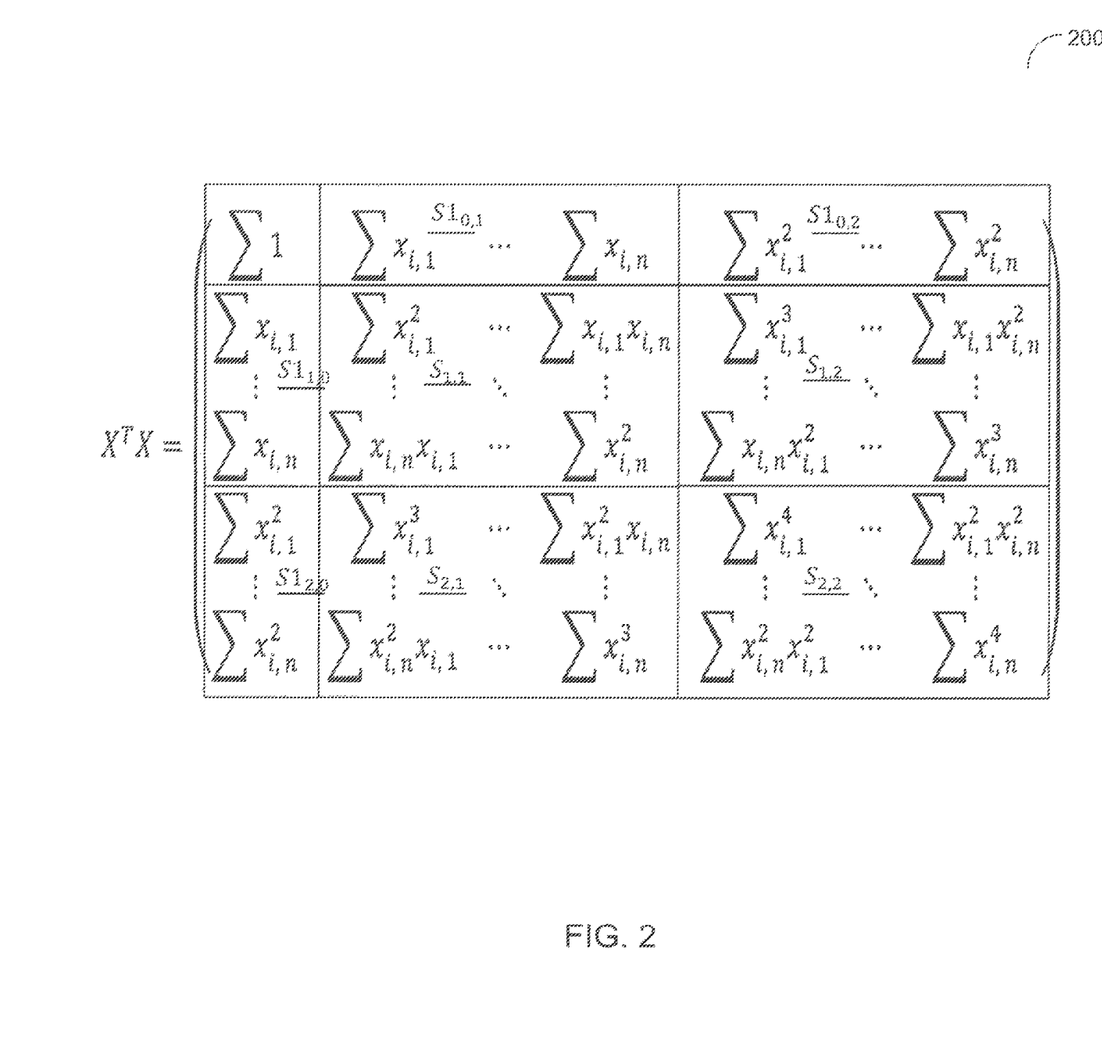
FIG. 2 schematically illustrates the iteration result matrix produced by methods of the present disclosure.

Upon generating the initial matrix X, an intermediate result sums may be produced by multiplying the transposed initial matrix $X^T$ by the initial matrix X:

sums=$X^T X$, which would produce a square matrix having (np+1) rows and (np+1) columns, as schematically illustrated by FIG. 2.

"Transposed matrix" herein refers to a matrix which is produced from the original matrix by reflecting the original matrix over its main diagonal, thus switching the row and column indices of the original matrix.

Since the resulting matrix sums is produced by multiplying a transposed matrix to itself, it is symmetrical with respect to its main diagonal, and thus only one of the upper or lower triangles of the matrix would need to be stored for any subsequent computations.

Based on the definition of the matrix multiplication operation, which states that the element with the indices (i,j) of the resulting matrix is a dot-product of the i-th line of the multiplicand matrix and the j-th column of the multiplier matrix, in view of the fact that the matrix sums is produced by multiplying a transposed matrix X to itself, and further in view of the fact that the first column of the initial matrix X is filled with the values of one, the matrix sums may be represented by a combination of vectors $S1_{ij}$ and sub-matrices $S_{ij}$, such that each vector $S1_{ij}$ has n elements, and each submatrix Sij has (n*n) elements, as schematically illustrated by FIG. 2.

The intermediate matrix sums may then be utilized for computing the expected value as follows:

$$E(x_i^k x_j^l) = \frac{sums_{kl,ij}}{n} \quad (5)$$

where $sums_{kl,ij}$ represents the element indexed (i, j) (i.e., the i-th element of j-th column) of the submatrix denoted as $S_{kl}$.

In view of the above-referenced representation of the matrix sums by a combination of vectors and sub-matrices, the above equation may be transformed as follows:

$$E(x_i^k x_j^l) = sums_{kl,ii}/n = sums_{(k-1)*n+i+1,(l-1)*n+j+1}/n \quad (6)$$

The computed value of $E(x_i^k x_j^l)$ may then be utilized for computing the requisite statistical bivariate moments (e.g., mean, co-variance, co-skewness, etc.) using their respective definitions (e.g., equations (1) and (2) for computing the mean and variance, respectively).

The above-described method of statistical moment computation may be performed iteratively, in parallel with acquiring the traces of samples. As m new traces are added to the input data set, the previously stored intermediate result (i.e., the sums matrix) may be iteratively updated with new data (by adding the newly computed sums matrix to the sums matrix saved at the previous iteration), as described in more detail herein below with reference to FIG. 3. The computation cycle may be terminated when no new traces are available or when a terminating condition has been met (e.g., vulnerability of the device under test to side channel attacks is established).

Figure 3:
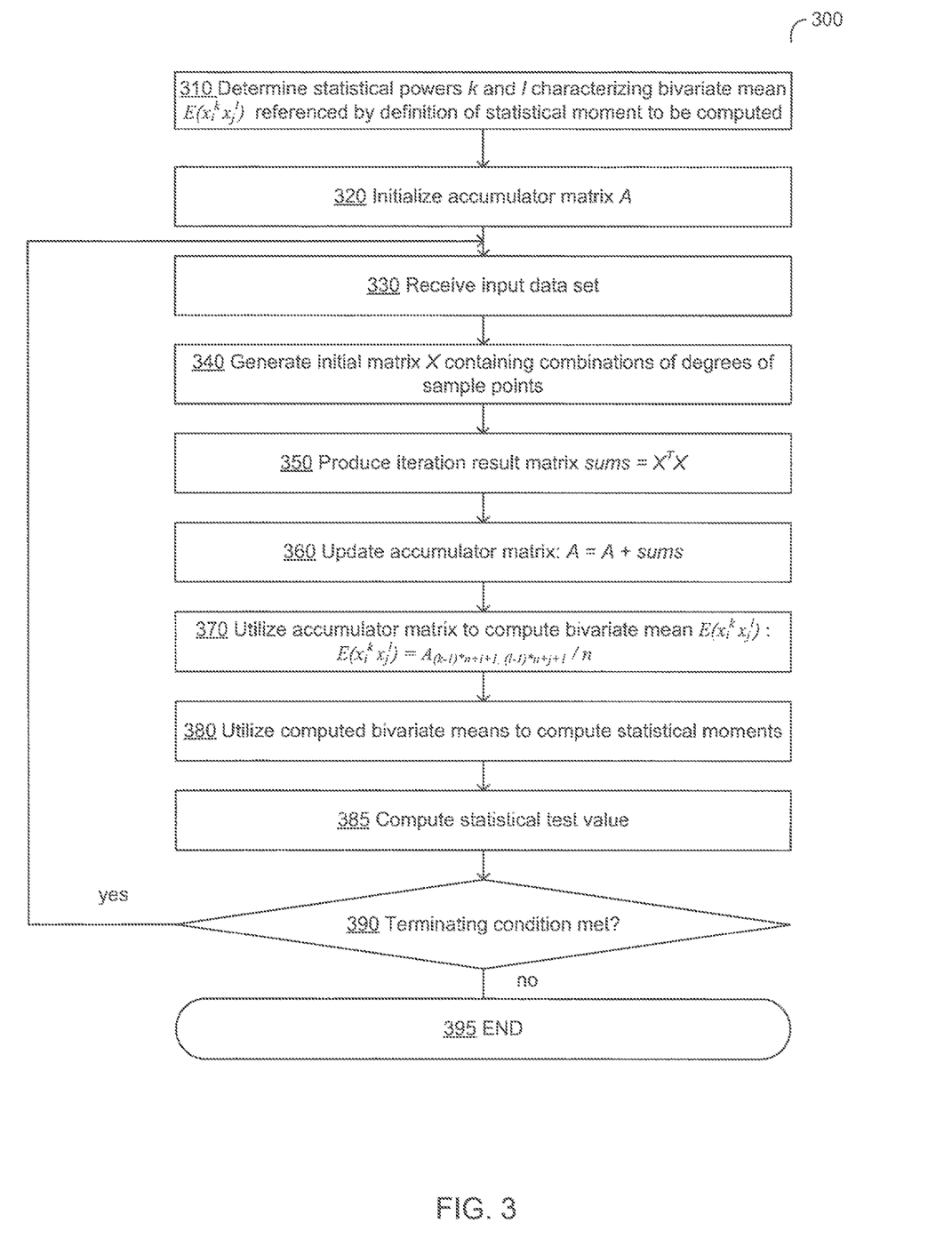
FIG. 3 depicts a flow diagram of an example method of calculating bivariate statistical moments, in accordance with one or more aspects of the present disclosure.

FIG. 3 depicts a flow diagram of one illustrative example of method 300 of calculating bivariate statistical moments, in accordance with one or more aspects of the present disclosure. Method 300 and/or each of its individual functions, routines, subroutines, or operations may be performed by one or more general purpose or specialized processing devices of a computer system (e.g., example computer system 1000 of FIG. 5). In certain implementations, method 300 may at least partially be performed by specialized hardware accelerator circuitry implementing one or more operations of method 300.

In certain implementations, method 300 may be performed by a single processing thread. Alternatively, method 300 may be performed by two or more processing threads, each thread executing one or more individual functions, routines, subroutines, or operations of the method. In certain implementations, the processing threads implementing method 300 may be synchronized (e.g., using semaphores, critical sections, and/or other thread synchronization mechanisms).

At block 310, the processing device may determine the exponents k and l characterizing the bivariate mean value $E(x_i^k x_j^l)$ which is referenced by the definition of the statistical moment to be computed. For example, as shown herein above by equations (1) and (2), for computing the bivariate mean value, the requisite exponents are k=1 and l=1; for computing the bivariate variance, the requisite exponents are k=2 and l=2. The requisite exponent for computing bivariate higher-order statistical moments, such as co-skewness, co-kurtosis, etc., may similarly be determined using their respective definitions.

At block 320, a processing device implementing the method may initialize, with zero values, the accumulator matrix representing the intermediate result to be updated by each iteration of the method.

At block 330, the processing device may receive the input data set, which may represent a plurality of observed values of one or more variables. The input data set may include multiple traces, and each trace may in turn include multiple sample points.

At block 340, the processing device may generate the initial matrix containing various combinations of all requisite degrees of the sample points. The matrix may include m rows and (n*p+1) columns, m is the number of traces, n is the number of sample points in each trace, and p is the maximum requisite degree corresponding to the ordinal number of the highest statistical moment to be computed. Each row of the matrix may be represented by a vector including an element equal to one and also including p sequences of elements, such each sequence includes n elements representing a corresponding degree of all sample points, and the sequences can appear in any order. Similarly, rows of the matrix (representing the respective traces) may appear in any order. Furthermore, in certain implementations, the matrix may contain additional rows and/or columns carrying some auxiliary or other related data, in which case the matrix would contain (m+q) rows and (n*p+r) columns, where q and (r−1) represent the numbers or rows and columns carrying the auxiliary or other related data.

At block 350, the processing device may produce an iteration result matrix sums representing a product of multiplying the transposed initial matrix $X^T$ by the initial matrix X: sums=$X^T$X. This multiplication, which results in a symmetric matrix, can be performed using processor-optimized linear algebra routines and can take less memory than prior art methods. In certain implementations, the matrix computations may be performed using specialized computational software packages, such as Basic Linear Algebra Subprograms (BLAS). Other packages of processor-optimized linear algebra routines may be used as well. Some example packages include: Intel Math Kernel Library, NVIDIA cuBLAS library, OpenCL, Engineering and Scientific Subroutine Library, and Automatically Tuned Linear Algebra Software.

At block 360, the processing device may update the accumulator matrix A by adding to it the iteration result matrix: A=A+sums.

At block 370, the processing device may utilize the accumulator matrix A for computing the bivariate mean value $E(x_i^k x_j^l)$ having the requisite exponents k and l:

$$E(x_i^k x_j^l) = A_{(k-1)*n+i+1,(l-1)*n+j+1}/n$$

At block 380, the processing device may utilize the computed value of $E(x_i^k x_j^l)$ for computing the requisite bivariate statistical moments (e.g., mean, co-variance, co-skewness, etc.) using their respective definitions (e.g., equations (1) and (2) for computing the mean and variance, respectively).

At block 385, the processing device may utilize the statistical moment which has been calculated at block 370 for computing the Student's or Welch's t-test value on the two input data sets:

$$t = (\mu_0 - \mu_1)/\sqrt{(s_0^2/m_0 + s_1^2/m_1)}$$

where $\mu_0$ and $\mu_1$ are the sample means of the first and second datasets, respectively, represented by vectors having the same size as the processed waveforms, $s_0^2$ and $s_1^2$ are variances of the first and second datasets, respectively, and $m_0$ and $m_1$ are the number of sample traces in the first and second datasets, respectively.

Responsive to determining, at block 390, that the terminating condition has been met, the method may terminate at block 395; otherwise, the method may loop back to block 330. In an illustrative example, the terminating condition may evaluate the availability of new traces added to the input data set: in the absence of new data, the method may terminate. In another illustrative example, the terminating condition may compare the t-test value computed at block 385 to a threshold value in order to determine whether the two data sets have been drawn from the same statistical population and therefore are statistically indistinguishable from each other.

As noted herein above, the statistical moment computation methods described herein may be utilized for the statistical analysis of the acquired side channel responses of a target cryptographic data processing device. In certain implementations, the device vulnerability evaluation method may utilize two data sets $D_0$ and $D_1$ or specify the respective data set generation procedures. The device vulnerability evaluation method may iteratively draw pairs of data blocks of a pre-defined size from the two input data sets, process the data blocks by the device being evaluated while recording the side-channel response (e.g., the power consumption and/or the electromagnetic emission) of the device, convert the recorded side-channel response waveforms to matrices $X_0$ and $X_1$, calculate the iteration result matrices $sums_0 = X_0^T X_0$ and $sums_1 = X_1^T X_1$, add the calculated matrices to the respective accumulators, convert both accumulators to respective statistical moments, and compute the Welch's or Student's t-test values based on the computed statistical moments, as described in more detail herein below with reference to FIG. 4. The method may terminate when all the input data has been processed or when a significant leakage has been found (e.g., the t-test value of some samples exceeds a pre-defined threshold, e.g., the value of 4.5).

Figure 4:
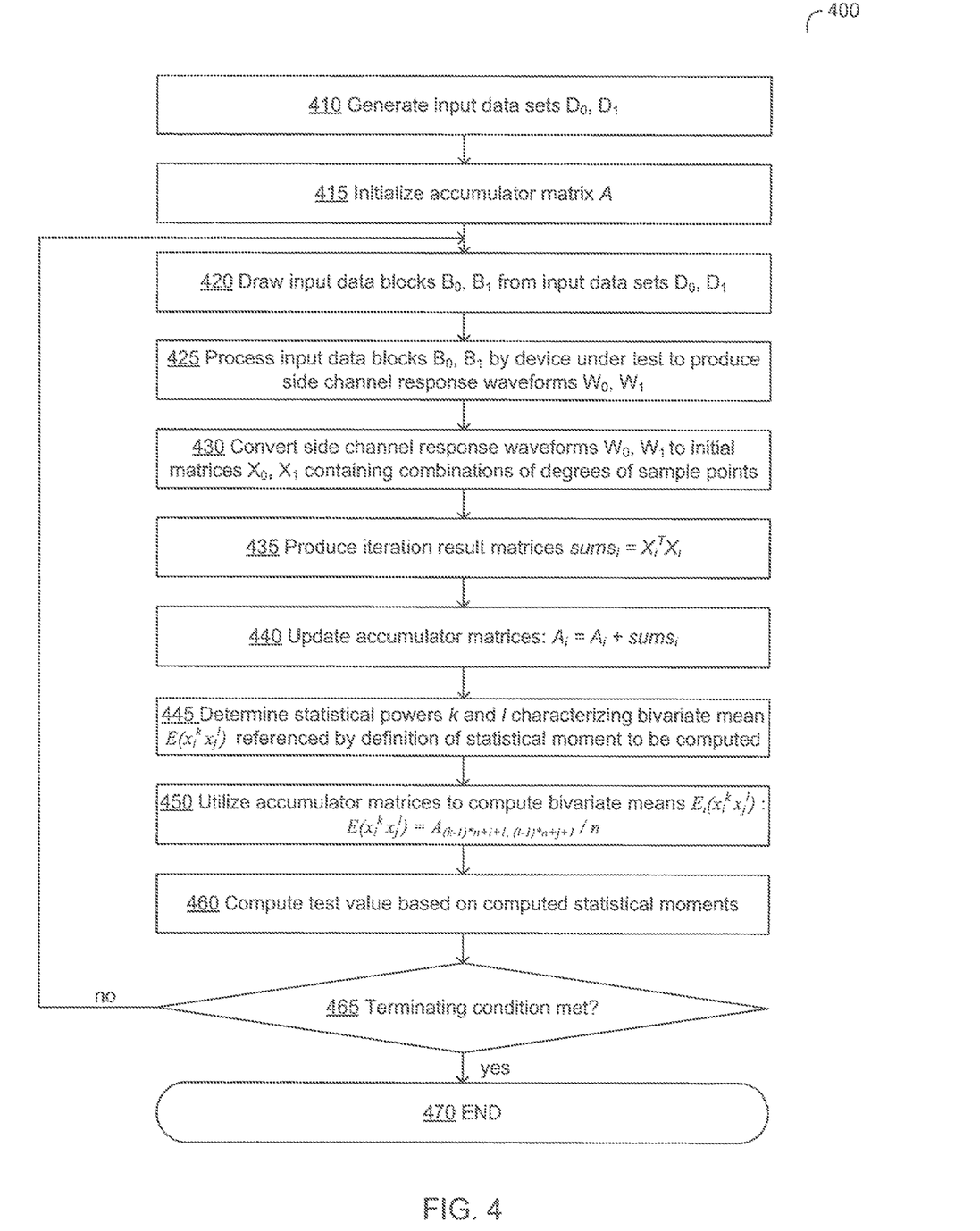
FIG. 4 depicts a flow diagram of an example method of evaluating side channel attack vulnerability of a cryptographic data processing device, in accordance with one or more aspects of the present disclosure.

FIG. 4 depicts a flow diagram of method 400 of evaluating side channel attack vulnerability of a cryptographic data processing device, in accordance with one or more aspects of the present disclosure. Method 400 and/or each of its individual functions, routines, subroutines, or operations may be performed by one or more general purpose or specialized processing devices of a computer system (e.g., example computer system 1000 of FIG. 5). In certain implementations, method 400 may at least partially be performed by specialized hardware accelerator circuitry implementing one or more operations of method 400.

In certain implementations, method 400 may be performed by a single processing thread. Alternatively, method 400 may be performed by two or more processing threads, each thread executing one or more individual functions, routines, subroutines, or operations of the method. In certain implementations, the processing threads implementing method 400 may be synchronized (e.g., using semaphores, critical sections, and/or other thread synchronization mechanisms).

At block 410, a processing device implementing the method may generate two data sets $D_0$ and $D_1$. In an illustrative example, the data sets may be randomly generated. In another illustrative example, the data sets may be generated based on certain pre-defined rules, such that processing each data set would produce a certain intermediate state of the cryptographic data processing device being tested. The intermediate states of the cryptographic data processing device may be characterized by sequences of one or more bits that are stored and/or processed by a certain circuit of the device.

At block 415, the processing device may initialize, with zero values, the accumulator matrices $A_0$ and $A_1$ representing the intermediate results to be updated by each iteration of the method.

At block 420, the processing device may draw a pair of data blocks of a pre-defined size from the respective data sets $D_0$ and $D_1$.

At block 425, the processing device may process the data blocks by the device under test while recording the side-channel response (e.g., the power consumption, the electromagnetic emission, the sound emission, and/or the heat emission) of the device, thus producing waveforms $W_0$ and $W_1$ corresponding to data blocks $B_0$ and $B_1$.

At block 430, the processing device may convert the recorded side-channel response waveforms to the initial matrices $X_0$ and $X_1$, such that each initial matrix would contain various combinations of all requisite degrees of the sample points produced by digitizing the respective waveform. Each matrix may contains m rows and (n*p+1) columns, m is the number of traces representing the digitized waveform, n is the number of sample points in each trace, and p is the maximum requisite degree corresponding to the ordinal number of the highest statistical moment to be computed. Each row of the matrix may be represented by a vector including an element equal to one and also including p sequences of elements, such each sequence includes n elements representing a corresponding degree of all sample points, and the sequences can appear in any order. Similarly, rows of the matrix (representing the respective traces) may appear in any order. Furthermore, in certain implementations, the matrix may contain additional rows and/or columns carrying some auxiliary or other related data, in which case the matrix would contain (m+q) rows and (n*p+r) columns, where q and (r−1) represent the numbers or rows and columns carrying the auxiliary or other related data.

At block 435, the processing device may produce iteration result matrices $sums_0$ and $sums_1$ representing the respective digitized waveforms $W_0$ and $W_1$. Each iteration result matrix sums may be represented by a product of multiplying the transposed initial matrix $X_i^T$ by the initial matrix $X_i$: $sums = X_i^T X_i$.

Since the iteration result matrix $sums = X_i^T X_i$ is symmetric, both matrices $sums_0$ and $sums_1$ may be stored in a single matrix: for example, results from dataset $D_0$ may be stored in the upper triangle while results from dataset $D_1$ may be stored in the lower triangle, or vice versa. The dimension of such a composite matrix would be (pn+2, pn+1), which reflects the fact that the composite matrix stores both diagonals for $D_0$ and $D_1$.

At block 440, the processing device may update the respective accumulator matrices $A_1$ and $A_2$ by adding to it the iteration result matrix: $A_i = A_i + \text{sums}_i$. In certain implementations, accumulator matrices $A_1$ and $A_2$ may be stored as one matrix, as explained herein above.

At block 445, the processing device may determine the exponents k and l characterizing the bivariate mean value $E(x_i^k x_j^l)$ which is referenced by the definition of the statistical moment to be computed. For example, as shown herein above by equations (1) and (2), for computing the bivariate mean value, the requisite exponents are k=1 and l=1; for computing the bivariate variance, the requisite exponents are k=2 and l=2. The requisite exponent for computing higher-order statistical moments, such as co-skewness, co-kurtosis, etc., may similarly be determined using their respective definitions.

At block 450, the processing device may utilize accumulator matrices $A_1$ and $A_2$ for computing the bivariate mean values $E_1(x_i^k x_j^l)$ and $E_2(x_i^k x_j^l)$ having the requisite exponents k and l:

$$E_1(x_i^k x_j^l) = A_{1(k-1)*n+t+1, (l-1)*n+j+1}/n$$

$$E_2(x_i^k x_j^l) = A_{2(k-1)*n+t+1, (l-1)*n+j+1}/n$$

At block 455, the processing device may utilize the computed values of $E_1(x_i^k x_j^l)$ and $E_2(x_i^k x_j^l)$ for computing the requisite bivariate statistical moments (e.g., mean, covariance, co-skewness, etc.) using their respective definitions (e.g., equations (1) and (2) for computing the mean and variance, respectively).

At block 460, the processing device may compute the Welch's or Student's t-test values based on the computed statistical moments:

$$t = (\mu_0 - \mu_1)/\sqrt{(s_0^2/m_0 + s_1^2/m_1)}$$

where $\mu_0$ and $\mu_1$ are the sample means of the first and second datasets, respectively, represented by vectors having the same size as the processed waveforms, $s_0^2$ and $s_1^2$ are variances of the first and second datasets, respectively, and $m_0$ and $m_1$ are the number of sample traces in the first and second datasets, respectively.

Responsive to determining, at block 465, that the terminating condition has been met, the method may terminate at block 470; otherwise, the method may loop back to block 420. In an illustrative example, the terminating condition may evaluate the availability of data blocks in the input data sets: in the absence of new data, the method may terminate. In another illustrative example, the terminating condition may compare, to a threshold value, the t-test value computed at block 460. In an illustrative example, the t-test value exceeding a pre-defined threshold (e.g., the value of 4.5) may be indicative of the potential device vulnerability to side channel attacks.

Figure 5:
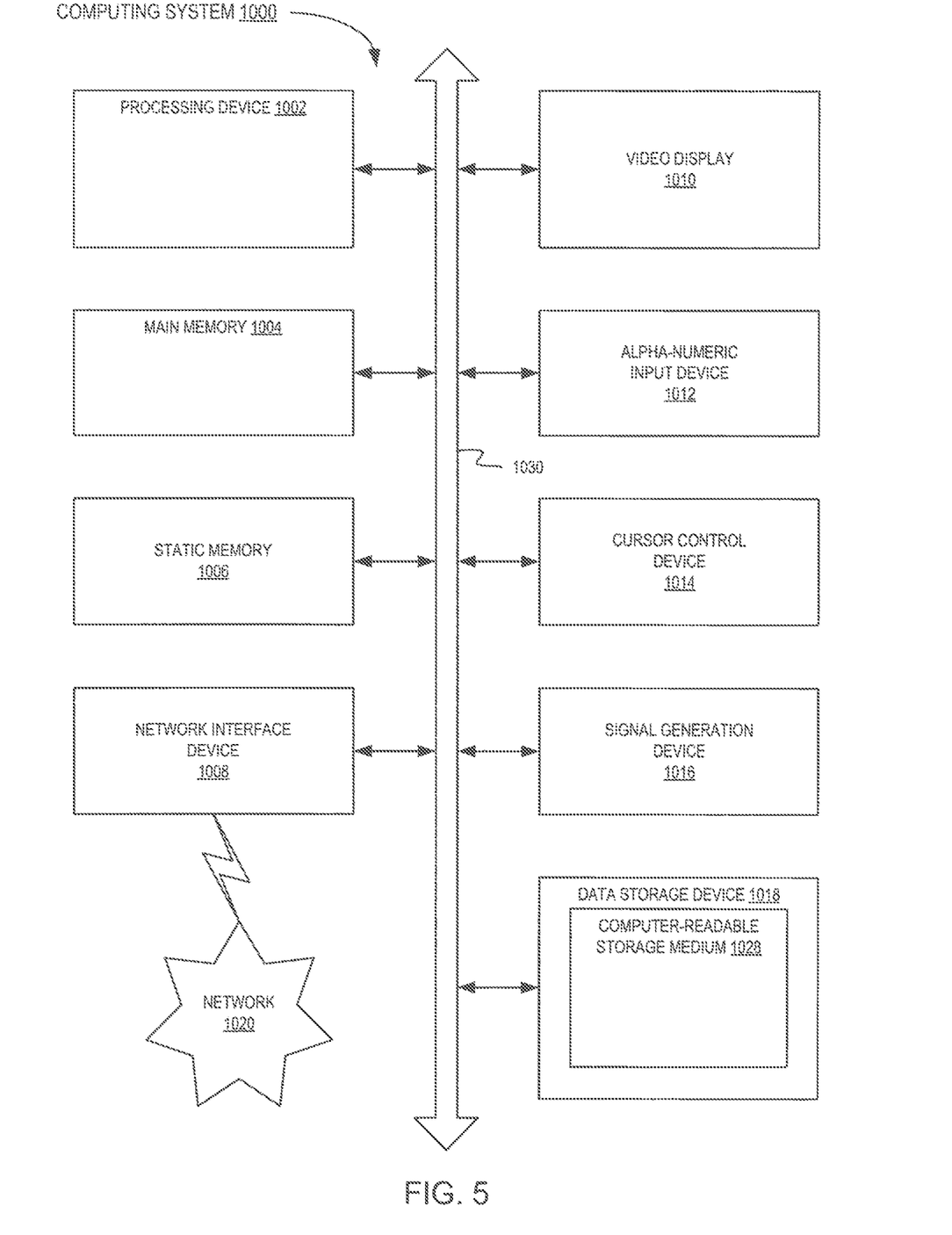
FIG. 5 illustrates a diagrammatic representation of an example computer system which may implement the methods described herein.

FIG. 5 illustrates a diagrammatic representation of a computer system 1000 which may implement the methods described herein. Computer system 1000 may be connected to other computer systems in a LAN, an intranet, an extranet, and/or the Internet. The computer system may operate in the capacity of a server machine in client-server network environment. The computer system may be provided by a personal computer (PC), a set-top box (STB), a server, a network router, switch or bridge, or any machine capable of executing a set of instructions (sequential or otherwise) that specify actions to be taken by that machine. Further, while only a single computer system is illustrated, the term "computer system" shall also be taken to include any collection of computer systems that individually or jointly execute a set (or multiple sets) of instructions to perform the methods described herein.

The example computer system 1000 may include a processing device 1002, which in various illustrative examples may be a general purpose or specialized processor comprising one or more processing cores. The example computer system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The example computer system 1000 may further include a network interface device 1008 which may communicate with a network 1020. The example computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions implementing any one or more of the methods or functions described herein. The instructions may also reside, completely or at least partially, within the main memory 1004 and/or within the processing device 1002 during execution thereof by the example computer system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
receiving a side channel response of a cryptographic data processing device to a sequence of data processing operations being performed by the cryptographic data processing device;
determining, by a processing device, exponents characterizing a bivariate mean value referenced by a definition of a statistical moment to be computed;
receiving an input data set representing a plurality of observed values of one or more variables of the side channel response, the input data including a plurality of traces, each trace of the plurality of traces including a plurality of sample points;
generating an initial matrix comprising combinations of pre-determined degrees of the sample points, wherein each row of the initial matrix is represented by a vector comprising a plurality of sequences of elements, wherein each sequence of elements includes a pre-defined constant value followed by a plurality of elements representing a certain degree of the plurality of sample points, and wherein a maximum degree of the pre-determined degrees is greater than an ordinal number of the statistical moment to be computed;
producing a first intermediate result matrix represented by a product of multiplying a transpose of the initial matrix by the initial matrix;
retrieving an element of the first intermediate result matrix, wherein indices of the element are defined based on the exponents;
using the retrieved element of the first intermediate result matrix to compute the statistical moment of the side channel response, wherein computing the statistical moment is iteratively performed in parallel with receiving successive input data sets, and wherein both the first intermediate result matrix of a current iteration and a second intermediate result matrix of a previous iteration are stored in a single matrix; and
utilizing the computed statistical moment of the side channel response for evaluating side channel attack vulnerability of the cryptographic data processing device.

2. The method of claim 1, wherein the initial matrix comprises m rows and (n*p+1) columns, wherein m represents a number of traces, n represents a number of sample points in each trace, and p represents a maximum degree of the pre-determined degrees.

3. The method of claim 1, wherein transposing the initial matrix further comprises:
reflecting the initial matrix over a main diagonal of the original matrix.

4. The method of claim 1, wherein a first index of the element of the first intermediate result matrix is equal to (k−1)*n+i+1, wherein k represents a first exponent characterizing the bivariate mean value referenced by the definition of a statistical moment to be computed, wherein n represents the number of sample points in each trace, and i represents an index of a first argument of the bivariate mean value.

5. A non-transitory computer-readable storage medium having thereon executable instructions which, when executed by a processing device, cause the processing device to:
receive a side channel response of a cryptographic data processing device to a sequence of data processing operations being performed by the cryptographic data processing device;
determine exponents characterizing a bivariate mean value referenced by a definition of a statistical moment to be computed;
receive an input data set representing a plurality of observed values of one or more variables of the side channel response, the input data including a plurality of traces, each trace of the plurality of traces including a plurality of sample points;
generate an initial matrix comprising combinations of pre-determined degrees of the sample points, wherein each row of the initial matrix is represented by a vector comprising a plurality of sequences of elements, wherein each sequence of elements includes a pre-defined constant value followed by a plurality of elements representing a certain degree of the plurality of sample points, and wherein a maximum degree of the pre-determined degrees is greater than an ordinal number of the statistical moment to be computed;
produce a first intermediate result matrix represented by a product of multiplying a transpose of the initial matrix by the initial matrix;
retrieve an element of the first intermediate result matrix, wherein indices of the element are defined based on the exponents;
use the retrieved element of the first intermediate result matrix to compute the statistical moment of the side channel response, wherein computing the statistical moment is iteratively performed in parallel with receiving successive input data sets, and wherein both the first intermediate result matrix of a current iteration and a second intermediate result matrix of a previous iteration are stored in a single matrix; and
utilize the computed statistical moment of the side channel response for evaluating side channel attack vulnerability of the cryptographic data processing device.

6. The non-transitory computer-readable storage medium of claim 5, wherein the initial matrix comprises m rows and (n*p+1) columns, wherein m represents a number of traces, n represents a number of sample points in each trace, and p represents a maximum degree of the pre-determined degrees.

7. The non-transitory computer-readable storage medium of claim 5, wherein transposing the initial matrix further comprises:
reflecting the initial matrix over a main diagonal of the original matrix.

8. The non-transitory computer-readable storage medium of claim 5, wherein a first index of the element of the first intermediate result matrix is equal to (k−1)*n+i+1, wherein k represents a first exponent characterizing the bivariate mean value referenced by the definition of a statistical moment to be computed, wherein n represents the number of sample points in each trace, and i represents an index of a first argument of the bivariate mean value.

* * * * *